US012135801B2

(12) United States Patent
Desai et al.

(10) Patent No.: US 12,135,801 B2
(45) Date of Patent: *Nov. 5, 2024

(54) TECHNOLOGIES FOR TRUSTED I/O PROTECTION OF I/O DATA WITH HEADER INFORMATION

(71) Applicant: Intel Corporation, Santa Clara, CA (US)

(72) Inventors: Soham Jayesh Desai, Rochester, MN (US); Siddhartha Chhabra, Portland, OR (US); Bin Xing, Hillsboro, OR (US); Pradeep M. Pappachan, Tualatin, OR (US); Reshma Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,628

(22) Filed: Aug. 18, 2022

(65) Prior Publication Data

US 2022/0405403 A1 Dec. 22, 2022

Related U.S. Application Data

(63) Continuation of application No. 16/704,168, filed on Dec. 5, 2019, now Pat. No. 11,423,159, which is a
(Continued)

(51) Int. Cl.
*G06F 21/00* (2013.01)
*G06F 13/20* (2006.01)
(Continued)

(52) U.S. Cl.
CPC ............ *G06F 21/602* (2013.01); *G06F 13/20* (2013.01); *G06F 13/28* (2013.01); *G06F 21/57* (2013.01);
(Continued)

(58) Field of Classification Search
CPC .. G06F 21/6218; G06F 21/57; G06F 21/6281; G06F 21/602; G06F 21/85;
(Continued)

(56) References Cited

U.S. PATENT DOCUMENTS 7,716,389 B1 5/2010 Bruce et al.
10,181,946 B2 1/2019 Lal et al.
(Continued)

OTHER PUBLICATIONS

Final Office Action, U.S. Appl. No. 15/628,008, filed Oct. 17, 2019, 33 pages.
(Continued)

*Primary Examiner* — Tri M Tran
(74) *Attorney, Agent, or Firm* — Nicholson De Vos Webster & Elliott LLP

(57) ABSTRACT

Technologies for trusted I/O include a computing device having a hardware cryptographic agent, a cryptographic engine, and an I/O controller. The hardware cryptographic agent intercepts a message from the I/O controller and identifies boundaries of the message. The message may include multiple DMA transactions, and the start of message is the start of the first DMA transaction. The cryptographic engine encrypts the message and stores the encrypted data in a memory buffer. The cryptographic engine may skip and not encrypt header data starting at the start of message or may read a value from the header to determine the skip length. In some embodiments, the cryptographic agent and the cryptographic engine may be an inline cryptographic engine. In some embodiments, the cryptographic agent may be a channel identifier filter, and the cryptographic engine may be processor-based. Other embodiments are described and claimed.

9 Claims, 8 Drawing Sheets

Related U.S. Application Data continuation of application No. 15/628,006, filed on Jun. 20, 2017, now Pat. No. 10,552,620.

(60) Provisional application No. 62/352,357, filed on Jun. 20, 2016, provisional application No. 62/352,356, filed on Jun. 20, 2016.

(51) Int. Cl.
| | |
|---|---|
| *G06F 13/28* | (2006.01) |
| *G06F 21/57* | (2013.01) |
| *G06F 21/60* | (2013.01) |
| *G06F 21/62* | (2013.01) |
| *G06F 21/85* | (2013.01) |
| *G09C 1/00* | (2006.01) |
| *H04L 9/32* | (2006.01) |
| *H04L 9/40* | (2022.01) |
| *G06F 21/51* | (2013.01) |
| *H04L 9/06* | (2006.01) |

(52) U.S. Cl.
CPC ...... *G06F 21/6218* (2013.01); *G06F 21/6281* (2013.01); *G06F 21/85* (2013.01); *G09C 1/00* (2013.01); *H04L 9/32* (2013.01); *H04L 63/126* (2013.01); *G06F 21/51* (2013.01); *H04L 9/0637* (2013.01); *H04L 9/3242* (2013.01); *H04L 63/12* (2013.01)

(58) Field of Classification Search
CPC .......... G06F 13/20; G06F 13/28; G06F 21/51; G09C 1/00; H04L 9/32; H04L 63/126; H04L 63/12; H04L 9/3242; H04L 9/0637
See application file for complete search history.

(56) References Cited

U.S. PATENT DOCUMENTS

| | | | |
|---|---|---|---|
| 11,656,916 B2 | 5/2023 | Kakaiya et al. | |
| 2004/0025040 A1 | 2/2004 | Aoki | |
| 2004/0193757 A1 | 9/2004 | Creta et al. | |
| 2006/0059574 A1 | 3/2006 | Fayad et al. | |
| 2008/0082828 A1 | 4/2008 | Jennings et al. | |
| 2008/0165952 A1 | 7/2008 | Smith et al. | |
| 2008/0170686 A1 | 7/2008 | Nemoto | |
| 2009/0217050 A1* | 8/2009 | Amiel ............... G06F 21/72 |
| | | | 713/176 |
| 2009/0268738 A1 | 10/2009 | Tchapda | |
| 2013/0185548 A1 | 7/2013 | Djabarov et al. | |
| 2014/0093074 A1 | 4/2014 | Gotze et al. | |
| 2014/0380425 A1 | 12/2014 | Lockett et al. | |
| 2015/0086012 A1 | 3/2015 | Chhabra et al. | |
| 2016/0274918 A1 | 9/2016 | Moon | |
| 2017/0024584 A1 | 1/2017 | Chhabra et al. | |
| 2017/0090800 A1 | 3/2017 | Alexandrovich et al. | |
| 2019/0042431 A1 | 2/2019 | Gerzon et al. | |
| 2023/0110230 A1 | 4/2023 | Kida et al. | |
| 2023/0315857 A1 | 10/2023 | Sahita et al. | |

OTHER PUBLICATIONS

Final Office Action, U.S. Appl. No. 16/931,543, filed Nov. 9, 2022, 15 pages.
Final Office Action, U.S. Appl. No. 18/062,957, filed May 22, 2024, 13 pages.
Non-Final Office Action, U.S. Appl. No. 15/628,006, filed May 15, 2019, 6 pages.
Non-Final Office Action, U.S. Appl. No. 15/628,008, filed Apr. 4, 2019, 27 pages.
Non-Final Office Action, U.S. App. No. 16/704,168, filed Dec. 10, 2021, 6 pages.
Non-Final Office Action, U.S. Appl. No. 16/931,543, filed Mar. 31, 2022, 17 pages.
Non-Final Office Action, U.S. Appl. No. 18/062,957, filed Oct. 12, 2023, 17 pages.
Notice of Allowance, U.S. Appl. No. 15/628,006, filed Sep. 27, 2019, 18 pages.
Notice of Allowance, U.S. Appl. No. 15/628,008, filed May 28, 2020, 10 pages.
Notice of Allowance, U.S. Appl. No. 15/628,012, filed Feb. 21, 2019, 8 pages.
Notice of Allowance, U.S. App. No. 16/704, 168, filed Apr. 8, 2022, 16 pages.

* cited by examiner

TECHNOLOGIES FOR TRUSTED I/O PROTECTION OF I/O DATA WITH HEADER INFORMATION

CROSS-REFERENCE TO RELATED APPLICATIONS

This application is a continuation of and claims the benefit of and priority to U.S. application Ser. No. 16/704,168, entitled TECHNOLOGIES FOR TRUSTED I/O PROTECTION OF I/O DATA WITH HEADER INFORMATION, by Soham Jayesh Desai, et al., filed Dec. 5, 2019, now allowed, which is a continuation of and claims the benefit of and priority to U.S. application Ser. No. 15/628,006, entitled TECHNOLOGIES FOR TRUSTED I/O PROTECTION OF I/O DATA WITH HEADER INFORMATION, by Soham Jayesh Desai, et al., filed Jun. 20, 2017, now issued as 10,552,620, which claims the benefit of U.S. Provisional Patent Application Nos. 62/352,356 and 62/352,357, which were both filed Jun. 20, 2016. The entire contents of which are incorporated herein by reference.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
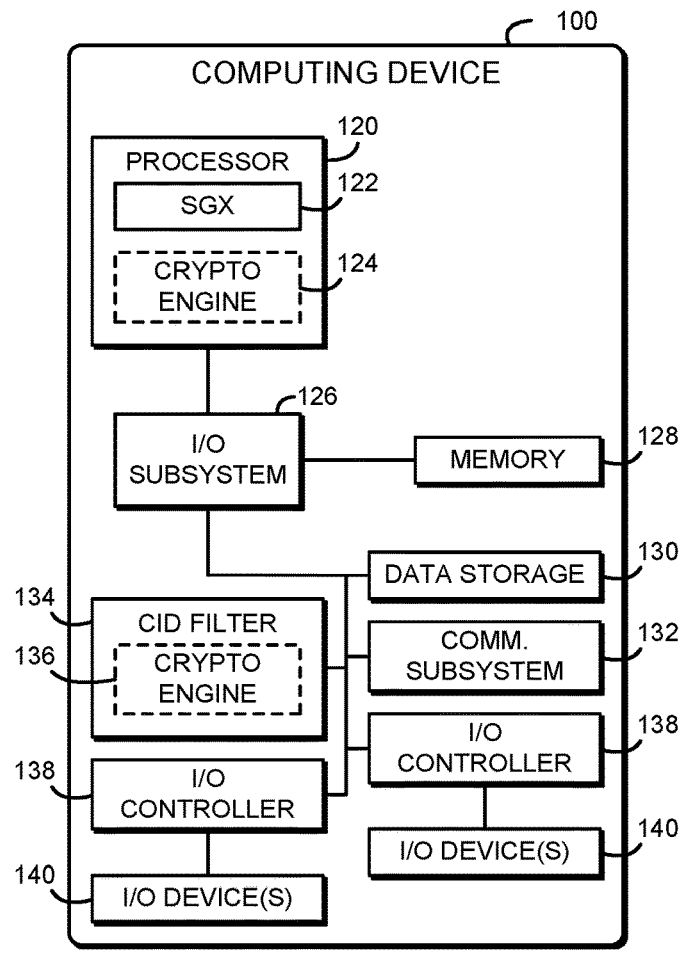
FIG. 1 is a simplified block diagram of at least one embodiment of a computing device for protecting I/O transfers with header data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for trusted I/O protection of DMA data including unencrypted header data is shown. In use, as described further below, a hardware cryptographic agent of the computing device 100 identifies the boundaries of a message received from an I/O controller. The message boundaries include the start of message and the message length. The start of message and message length information are provided to the cryptographic agent by the I/O controller, which has controller-specific knowledge of the message boundaries. A cryptographic engine of the computing device 100 encrypts the message and stores the message in a memory buffer. In some embodiments, the cryptographic engine may skip certain header data relative to the start of message, leaving that header data unencrypted. Thus, the computing device 100 may provide trusted I/O with integrity guarantees; that is, the computing device 100 may ensure that an entire message is encrypted or that a specified part of the message after the header data is encrypted. By allowing header data to remain unencrypted, the computing device 100 may re-use an existing software stack (e.g., operating system device drivers, I/O drivers, and other untrusted software) without modification, while still providing protected I/O with message integrity. For example, existing I/O drivers may examine header data to provide message routing and other functionality while potentially sensitive I/O data remains encrypted and inaccessible to untrusted software.

In some embodiments, the computing device 100 may maintain an authentication tag (AT) queue that stores ATs generated by the cryptographic engine. The computing device 100 may match cipher texts with the associated ATs using a short hash value for each message. Thus, the computing device 100 may perform an efficient, simple, and robust mechanism for managing AT entries needed for decryption in case of device software stacks which aggregate data buffers or which permit data buffer drops. Thus, the computing device 100 may also allow for reuse of existing software drivers and other components, with improved performance for I/O protection technologies.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 126, a memory 128, and a data storage device 130. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, and in some embodiments may include a cryptographic engine 124. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 122 may be embodied as a set of processor instruction extensions that allows the processor 120 to establish one or more secure enclaves in the memory 128. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, the cryptographic engine 124 may perform TIO functions such as encrypting and/or decrypting DMA I/O data input from and/or output to one or more I/O devices 140. In particular, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include programming support to allow software to program the cryptographic engine 124 and a corresponding CID filter 134, described further below. For example, the processor 120 may include one or more processor features to bind programming instructions to the cryptographic engine 124 and/or the CID filter 134, unwrap bound programming instructions, and perform other functions. Similarly, the processor 120 may include one or more processor features to bind programming instructions to an inline cryptographic engine 136, unwrap bound programming instructions, and perform other functions as described further below.

The memory 128 may be embodied as any type of volatile or non-volatile memory or data storage capable of performing the functions described herein. In operation, the memory 128 may store various data and software used during operation of the computing device 100 such operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 128 may be directly coupled to the processor 120, for example via an integrated memory controller hub. The I/O subsystem 126 may further include secure routing support, which may include hardware support to ensure I/O data cannot be misrouted in the I/O subsystem 126 under the influence of rogue software. The secure routing support may be used with the CID filter 134 to provide cryptographic protection of I/O data. Additionally, in some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 132, which may be embodied as any communication circuit, device, or collection thereof, capable of enabling communications between the computing device 100 and other remote devices over a computer network (not shown). The communications subsystem 132 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown in FIG. 1, the computing device 100 further includes a channel identifier (CID) filter 134, which may be embodied as any hardware component, functional block, logic, or other circuit that performs CID filtering function(s), including filtering I/O transactions based on CIDs inserted by one or more I/O controllers 138. For example, the CID filter 134 may observe DMA transactions inline, perform test(s) based on the CID and memory address included in the transaction, and drop transactions that fail the test(s). In some embodiments, the CID filter 134 may include a cryptographic engine 136, which may be embodied as one or more hardware functional blocks (IP blocks) or other hardware resources that performs HCTIO CE functions, such as encrypting and/or decrypting DMA I/O data input from and/or output to the I/O devices 140. For example, in some embodiments the cryptographic engine 136 may encrypt I/O data received from the I/O controller 138 and then store the encrypted data directly in the memory 128, preventing the plaintext I/O data from reaching the memory 128. Thus, the computing device 100 supports HCTIO encrypted DMA I/O data, and the encryption may be provided by dedicated hardware (i.e., the cryptographic engine 136) and/or by resources of the processor 120 (i.e., with the crypto engine 124). In the illustrative embodiment, the CID filter 134 is included in an SoC with the processor 120 and I/O subsystem 126. In other embodiments, the CID filter 134 may be incorporated in one or more components such as the I/O subsystem 126.

Each of the I/O controllers 138 may be embodied as any embedded controller, microcontroller, microprocessor, functional block, logic, or other circuit or collection of circuits capable of performing the functions described herein. In some embodiments, one or more of the I/O controllers 138 may be embedded in another component of the computing device 100 such as the I/O subsystem 126 and/or the processor 120. Additionally or alternatively, one or more of the I/O controllers 138 may be connected to the I/O subsystem 126 and/or the processor 120 via an expansion bus such as PCI Express (PCIe) or other I/O connection. As described above, the I/O controllers 138 communicate with one or more I/O devices 140, for example over a peripheral communications bus (e.g., USB, Bluetooth, etc.). The I/O devices 140 may be embodied as any I/O device, such as human interface devices, keyboards, mice, touch screens, microphones, cameras, and other input devices, as well as displays and other output devices. As described above, the I/O controllers 138 and associated DMA channels are uniquely identified using identifiers called channel identifiers (CIDs). Each I/O controller 138 may assert an appropriate CID with every DMA transaction, for example as part of a transaction layer packet (TLP) prefix, to uniquely identify the source of the DMA transaction and provide liveness protections. The CID also enables the isolation of I/O from different devices 140.

Figure 2:
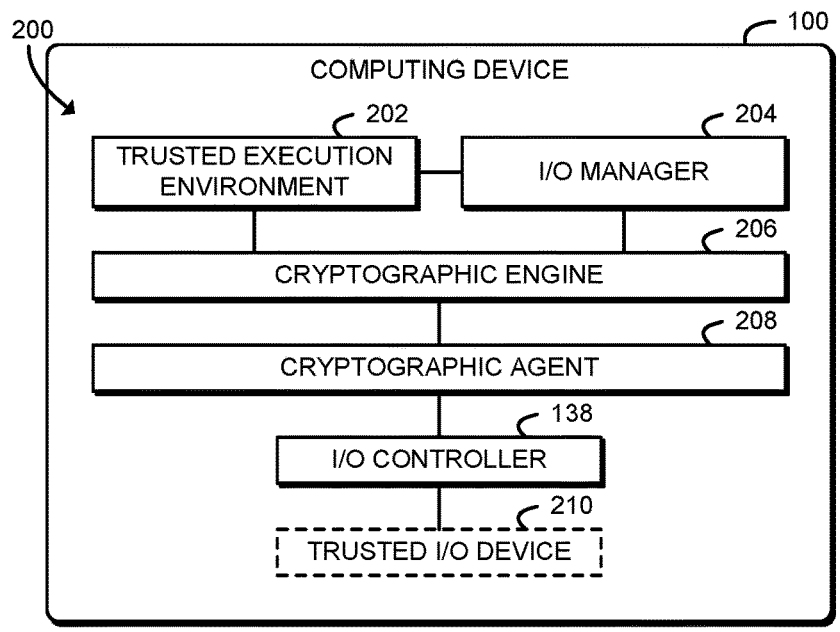
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a trusted execution environment 202, an I/O manager 204, a cryptographic engine 206, a cryptographic agent 208, and in some embodiments a trusted I/O device 210. The various components of the environment 200 may be embodied as hardware, firmware, software, or a combination thereof. As such, in some embodiments, one or more of the components of the environment 200 may be embodied as circuitry or collection of electrical devices (e.g., trusted execution environment circuitry 202, I/O manager circuitry 204, cryptographic engine circuitry 206, cryptographic agent circuitry 208, and/or trusted I/O circuitry 210). It should be appreciated that, in such embodiments, one or more of the trusted execution environment circuitry 202, the I/O manager circuitry 204, the cryptographic engine circuitry 206, the cryptographic agent circuitry 208, and/or the trusted I/O circuitry 210 may form a portion of the processor 120, the I/O subsystem 126, the CID filter 134, the cryptographic engine 136, one or more I/O devices 140, and/or other components of the computing device 100. Additionally, in some embodiments, one or more of the illustrative components may form a portion of another component and/or one or more of the illustrative components may be independent of one another.

The cryptographic agent 208 is configured to intercept a message from an I/O controller 138. The message may include one or more direct memory access (DMA) transactions generated by the I/O controller 138. The cryptographic agent 208 is further configured to determine a start of message (SOM) of the message in response to intercepting the message. The start of message is at the start of the first DMA transaction of the message. The cryptographic agent 208 is further configured to determine a message length of the message. The cryptographic agent 208 may be embodied as a hardware component of the computing device 100, such as the CID filter 134 and/or the inline cryptographic engine 136.

In some embodiments, the CID filter 134 may be configured to determine whether a memory address of the start of message is aligned on a message block size boundary and, if not, block the message. The CID filter 134 may be configured to allow the message if aligned on the message block size boundary. The CID filter 134 may be further configured to determine whether the message length of the message is greater than a message block size, where the message block size boundary is based on the message block size. The CID filter 134 may be configured to block the message if the message length is greater than the message block size.

The cryptographic engine 206 is configured to encrypt I/O data of the message to generate encrypted I/O data in response to determining the message boundaries (e.g., the start of message and the message length). The cryptographic engine 206 is configured to write the encrypted I/O data to a memory buffer in the memory 128. In some embodiments, the cryptographic engine 206 may be configured to skip a predetermined header length of the message starting at the start of message. In some embodiments, the cryptographic engine 206 may be configured to read a header length value at a predetermined position of the message relative to the start of message, and then skip that header length value of the message starting at the start of message. The cryptographic engine 206 may be embodied as, for example, the processor-based cryptographic engine 124 of the processor 120 or the inline cryptographic engine 136.

The trusted execution environment (TEE) 202 may be embodied as any trusted software and/or hardware environment of the computing device 100. For example, the TEE 202 may be embodied as one or more application enclaves, device driver enclaves, or other secure enclaves established using the secure enclave support 122 of the processor 120. The TEE 202 may be configured to program the cryptographic engine 206 with the predetermined header length, which is skipped (i.e., not encrypted) as described above. Similarly, in some embodiments, the TEE 202 may be configured to program the cryptographic engine 206 with a predetermined position in the message that contains the header length value. In some embodiments, the TEE 202 may be configured to program the CID filter 134 with the message block size. In some embodiments, the TEE 202 may be configured to program the TIO device 210 to block control requests.

The trusted I/O device 210 is configured to intercept a control channel request in response to being programmed to block control requests, determine whether the control channel request includes a device configuration change request, and, if so, block the control channel request. The trusted I/O device 210 may be embodied as, for example, an I/O device 140 that is permanently coupled to the I/O controller 138 (e.g., physically attached and not hot-pluggable).

The I/O manager 204 may be embodied as or otherwise include one or more I/O bus drivers, class drivers, filter drivers, or other kernel-mode components of an I/O stack of the computing device 100. Accordingly, the I/O manager 204 may also be embodied as, include, or otherwise use one or more memory management units or other components to facilitate direct memory access (DMA) transactions between I/O controllers 138 and the memory 128. In some embodiments, the I/O manager 204 may be configured to write the message to a shadow memory buffer of the computing device in response to the CID filter 134 allowing the message. The shadow memory buffer is located in a range of the memory 128 that is inaccessible to software of the computing device 100. The I/O manager 204 may be further configured to invoke a processor instruction to copy and encrypt the message in response the message being written to the shadow memory buffer. In those embodiments, the cryptographic engine 206 (e.g., the cryptographic engine 124 of the processor 120) may encrypt the I/O data of the message and write the encrypted I/O data to the memory buffer in response to invocation of the processor instruction.

Figure 3:
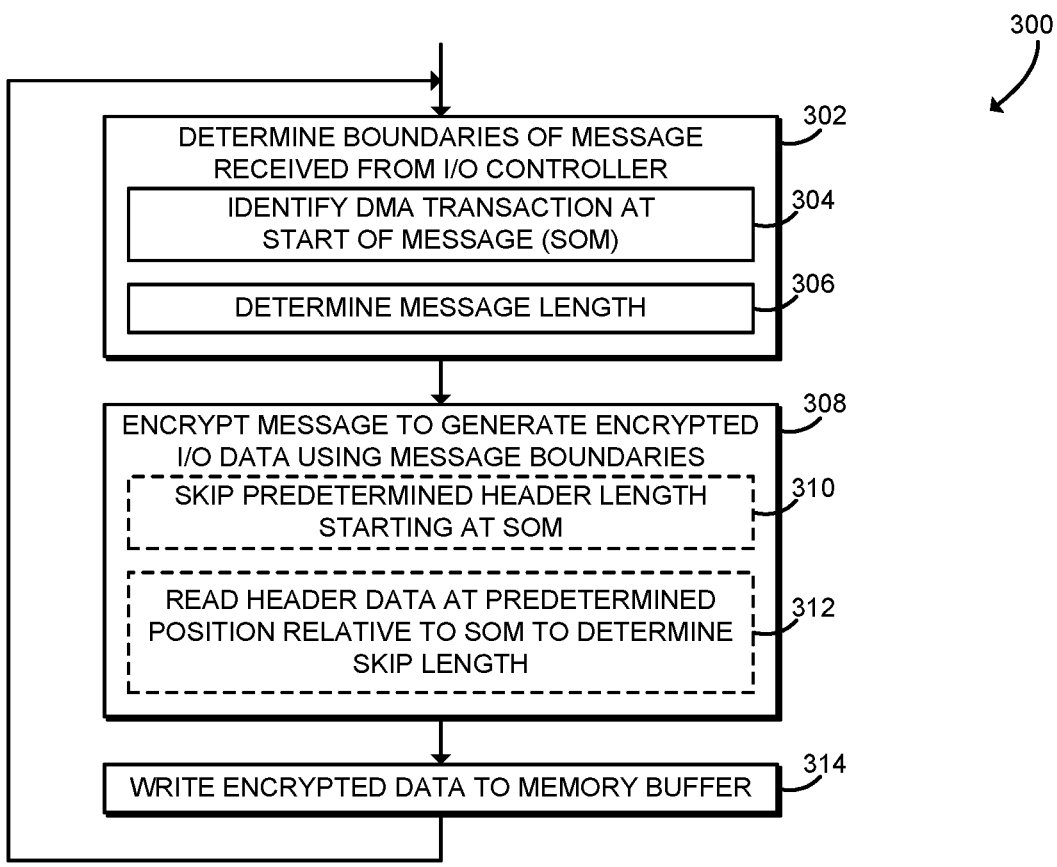
FIG. 3 is a simplified flow diagram of at least one embodiment of a method for protecting I/O transfers with header data that may be executed by the computing device of FIGS. 1-2.

Referring now to FIG. 3, in use, the computing device 100 may execute a method 300 for protecting I/O transfers with header data. It should be appreciated that, in some embodiments, the operations of the method 300 may be performed by one or more components of the environment 200 of the computing device 100 as shown in FIG. 2. The method 300 begins in block 302, in which the computing device 100 determines the boundaries of a message received from an I/O controller 138. The message may be embodied as a stream of data (e.g., bytes) that may start with a header and continues until immediately before the header that starts the next message. The message may include data transmitted in multiple direct memory access (DMA) transactions. For example, a message may include multiple DMA transactions that include header information and data generated by an I/O device 140, such as a USB webcam or other input device. In that example, multiple messages may be combined to form a video frame. The particular definition of a message may depend on the I/O controller 138 in use and/or a particular configuration of the I/O controller 138 (e.g., the definition of messages may vary for USB devices connected to an extensible host controller (xHC) in isochronous and bulk transfer modes). The message is cryptographically protected by the computing device 100, for example using a cryptographic engine 124, 136. Thus, each transaction of the message may include a channel identifier (CID), which uniquely identifies the I/O controller 138 and I/O device 140 that originates the message. To provide integrity guarantees (i.e., to ensure that the entire message and/or all potentially sensitive I/O data of the message is encrypted), the computing device 100 determines the boundaries of the message, including the start of message (SOM) and the message length.

Thus, in block 304 the computing device 100 identifies the DMA transaction at the start of message (SOM). The SOM is indicated by the I/O controller 138, which has controller-specific knowledge of the message boundaries. The particular technique used by the I/O controller 138 to signal SOM is implementation dependent and controller-specific. In the illustrative embodiment, the I/O controller 138 includes a SOM flag in a transaction level packet (TLP) header of the DMA transaction that marks the SOM. Additionally or alternatively, in some embodiments the I/O controller 138 may assert the SOM on a separate pin within an I/O complex of the computing device 100 (e.g., a platform controller hub, I/O controller hub, or other component of the I/O subsystem 126). In block 306, the computing device 100 determines a message length of the message. The computing device 100 may determine the message length by resetting a counter in response to receiving a DMA transaction with the SOM flag, and then incrementing the counter by a message length included in a TLP header of each DMA transaction.

In block 308, the computing device 100 encrypts the message to generate encrypted I/O data using the message boundaries. Because the computing device 100 has identified the SOM and the message length, the computing device 100 may ensure that all potentially sensitive I/O data received from the I/O controller 138 is encrypted. Additionally, with knowledge of the SOM, the computing device 100 may leave header metadata or other information at the beginning of the message unencrypted. In some embodiments, in block 310 the computing device 100 may skip a predetermined header length starting at the start of message. That is, the computing device 100 may not encrypt (i.e., may leave in plaintext) part of the message starting at the start of message and having a length equal to the predetermined header length. In some embodiments, in block 312 the computing device 100 may read header data at a predetermined position relative to the SOM to determine the length of header data to skip. For example, for USB cameras, the first byte of the message may include the header length.

In block 314, the computing device 100 writes the encrypted data to a memory buffer. Any unencrypted header data may also be written to the buffer before the encrypted data. The buffer may be processed with an ordinary I/O stack of the computing device 100, for example being processed by one or more bus drivers, class drivers, filter drivers, or other operating system I/O components. The encrypted data may be decrypted by an appropriate trusted execution environment 202, such as an application enclave or other trusted software component. After writing the I/O data, the method 300 loops back to block 302 to continue processing I/O data.

Figure 4:
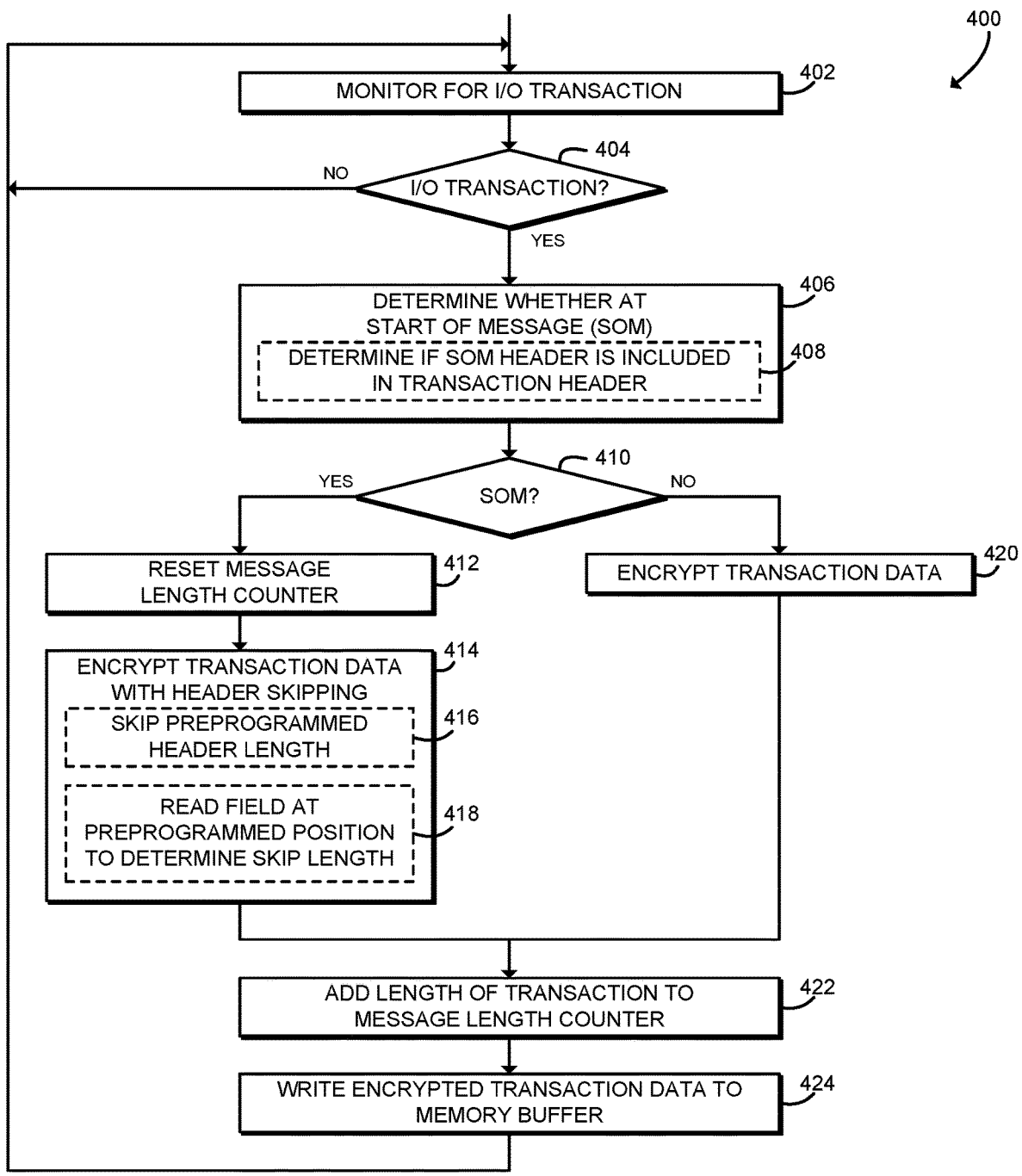
FIG. 4 is a simplified flow diagram of at least one embodiment of a method for protecting I/O transfers with header data using an inline cryptographic engine that may be executed by the computing device of FIGS. 1-2.

Referring now to FIG. 4, in use, the computing device 100 may execute a method 400 for protecting I/O transfers with header data using an inline cryptographic engine (CE) 136. It should be appreciated that, in some embodiments, the operations of the method 400 may be performed by one or more components of the environment 200 of the computing device 100 as shown in FIG. 2. The method 400 begins in block 402, in which the CE 136 monitors for an I/O transaction generated by an I/O controller 138. The I/O transaction may be embodied as, for example, a PCI DMA transaction or other DMA transaction generated by the I/O controller 138. In particular, the CE 136 may monitor for trusted I/O DMA transactions that include a channel identifier (CID) included in a transaction header (e.g., a TLP header). In block 404, the CE 136 determines whether an I/O transaction has been received. If not, the method 400 loops back to block 402 to continue monitoring for transactions. If a transaction has been received, the method 400 advances to block 406.

In block 406, the CE 136 determines whether the I/O transaction is at the start of message (SOM). In some embodiments, in block 408 the CE 136 may determine if a SOM flag or other header is included in a header of the I/O transaction. In block 410, the CE 136 checks whether the I/O transaction is at the start of message. If not, the method 400 branches to block 420, described below. If at the SOM, the method 400 branches to block 412.

In block 412, the CE 136 resets a message length counter. As described below, the message length counter may be used to determine the message length of a particular message. Because the current I/O transaction is at the SOM, the message length counter is reset.

In block 414, the CE 136 encrypts the I/O transaction with optional header skipping. The CE 136 may encrypt the transaction using an encryption key that is associated with the CID of the I/O transaction. The encryption key may be programmed to the CE 136 by trusted software, such as an application enclave or other secure enclave. The CE 136 may use any appropriate cryptographic algorithm to encrypt the I/O transaction, such as AES-GCM.

In some embodiments, in block 416 the CE 136 may skip a pre-programmed header length. In other words, the CE 136 may leave a pre-programmed length of data unencrypted, starting at the SOM. The unencrypted data may include, for example, metadata or other header data. The CE 136 may be securely programmed ahead of time with the header length by trusted software, such as an application enclave or other secure enclave. For example, the trusted software may execute an EBIND processor instruction to wrap programming instructions and generate an encrypted binary blob. The trusted software may pass the encrypted binary blob to untrusted software, such as an operating system device driver. The untrusted software may execute an UNWRAP processor instruction to cause the processor 120 to decrypt the encrypted binary blob and program the CE 136 with the programming instructions (including the header length).

In some embodiments, in block 418 the CE 136 may read a field at a preprogrammed position relative to the SOM to determine the skip length. For example, the CE 136 may read the first byte of the message starting at the SOM to determine the skip length, and then leave than number of bytes of the message unencrypted. The CE 136 may be securely programmed ahead of time with the position of the skip length value by trusted software. The CE 136 may be programmed using the EBIND and UNWRAP instructions, as described above. After encrypting the I/O transaction, the method 400 advances to block 422, described below.

Referring back to block 410, if the I/O transaction is not at the SOM, the method 400 branches to block 420, in which the CE 136 encrypts the I/O transaction. Similar to the I/O transaction at the SOM, the CE 136 may encrypt the transaction using the encryption key that is associated with the CID of the I/O transaction. However, unlike the I/O transaction at the SOM, the CE 136 may not skip any header data and, thus, the CE 136 encrypts the entire I/O transaction. The CE 136 may use any appropriate cryptographic algorithm to encrypt the I/O transaction, such as AES-GCM. After encrypting the I/O transaction, the method 400 advances to block 422.

In block 422, the CE 136 adds the length of the I/O transaction to the message length counter. The CE 136 may determine the length of the I/O transaction by reading length data from a TLP header. In block 424, the CE 136 writes the encrypted transaction data, including any unencrypted header data, to a memory buffer in the memory 128. The memory buffer may be embodied as, for example, a kernel I/O buffer or other buffer accessible by software of the computing device 100. As described above, after being written by the CE 136, the buffer may be processed with an ordinary I/O stack of the computing device 100. After writing the data, the method 400 loops back to block 402 to continue monitoring for I/O transactions.

Figure 5:
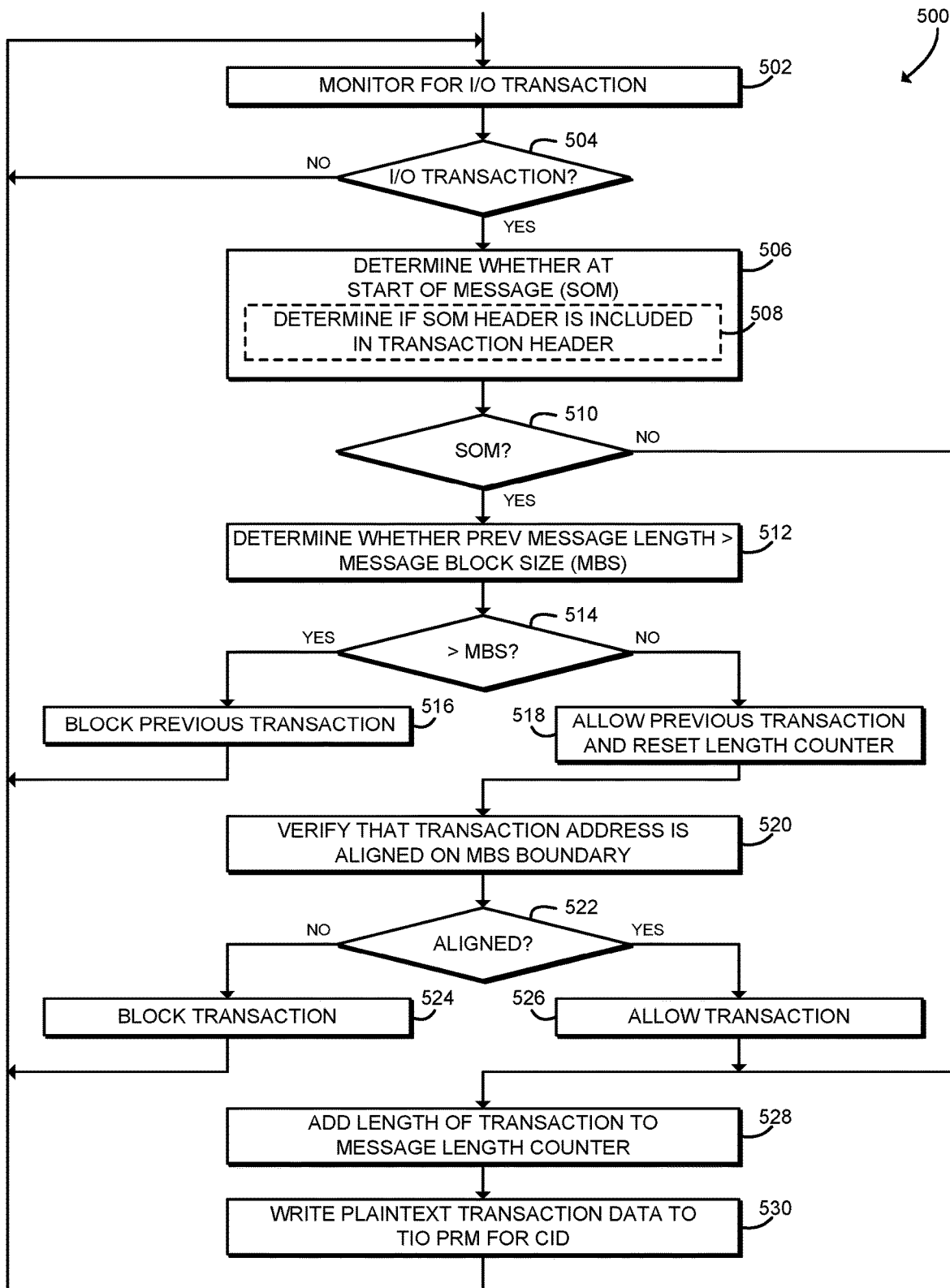
FIG. 5 is a simplified flow diagram of at least one embodiment of a method for protecting I/O transfers with header data using an inline channel identifier filter that may be executed by the computing device of FIGS. 1-2.

Referring now to FIG. 5, in use, the computing device 100 may execute a method 500 for protecting I/O transfers with header data using an inline channel identifier (CID) filter 134. It should be appreciated that, in some embodiments, the operations of the method 500 may be performed by one or more components of the environment 200 of the computing device 100 as shown in FIG. 2. The method 500 begins in block 502, in which the CID filter 134 monitors for an I/O transaction generated by an I/O controller 138. As described above, the I/O transaction may be embodied as, for example, a PCI DMA transaction or other DMA transaction generated by the I/O controller 138. In particular, the CID filter 134 may monitor for trusted I/O DMA transactions that include a channel identifier (CID) included in a transaction header (e.g., a TLP header). In block 504, the CID filter 134 determines whether an I/O transaction has been received. If not, the method 500 loops back to block 502 to continue monitoring for transactions. If a transaction has been received, the method 500 advances to block 506.

In block 506, the CID filter 134 determines whether the I/O transaction is at the start of message (SOM). In some embodiments, in block 508 the CID filter 134 may determine if a SOM flag or other header is included in a header of the I/O transaction. In block 510, the CID filter 134 checks whether the I/O transaction is at the start of message. If not, the method 500 branches to block 528, described below. If at the SOM, the method 500 branches to block 512.

In block 512, the CID filter 134 determines whether the previous message length, which is stored in a message length counter, is above a pre-programmed message block size (MBS). The MBS is a predetermined value that represents the largest length allowable for a message. The CID filter 134 may be securely programmed with the MBS by trusted software, for example using the EBIND and UNWRAP processor instructions described above. In block 514, the CID filter 134 checks whether the message length is greater than the MBS. If so, the method 500 branches to block 516, in which the CID filter 134 blocks the previous transaction. After blocking the transaction, the method 500 loops back to block 502 to continue monitoring for I/O transactions. Referring back to block 514, if the message length is not greater than the MBS, the method 500 branches to block 518, in which the CID filter 134 allows the previous transaction and resets the message length counter. After resetting the message length counter, the method 500 advances to block 520.

In block 520, the CID filter 134 verifies that a memory address of the I/O transaction is aligned on an MBS boundary. For example, the CID filter 134 may verify that the memory address is located at an integer multiple of the MBS. As described below in connection with FIG. 6, microcode or other resources of the processor 120 may use MBS boundaries to determine the SOM for a particular message. The CID filter 134 thus verifies that each message starts on an MBS boundary and that the message length is less than the MBS.

In block 522, the CID filter 134 determines whether the I/O transaction is aligned on an MBS boundary. If not, the method 500 branches to block 524, in which the CID filter 134 blocks the I/O transaction. The CID filter 134 may use any technique to block the transaction, for example, dropping the I/O transaction or otherwise preventing the I/O transaction from writing data to the memory 128. After blocking the transaction, the method 500 loops back to block 502 to continue monitoring for I/O transactions. Referring back to block 522, if the I/O transaction is aligned on an MBS boundary, the method 500 branches to block 526, in which the CID filter 134 allows the transaction. After allowing the transaction, the method 500 advances to block 528.

In block 528, the CID filter 134 adds the length of the I/O transaction to the message length counter. The CID filter 134 may determine the length of the I/O transaction by reading length data from a TLP header. In block 530, the CID filter 134 writes plaintext data of the I/O transaction to a trusted I/O (TIO) processor reserved memory (PRM) region that has been assigned to the CID of the I/O transaction. The TIO PRM may be embodied as a region of the memory 128 that has been carved out by BIOS or otherwise protected to prevent access by software of the computing device 100. The contents of the TIO PRM are thus not accessible to untrusted software of the computing device 100 such as an operating system or operating system drivers and also not accessible to trusted software such as application enclaves. Although the TIO PRM is not accessible to software, untrusted software may allocate or otherwise manage buffers within the TIO PRM. In particular, a contiguous range of the TIO PRM may be assigned to each CID, and the CID filter 134 may be programmed with the corresponding ranges for each CID. In addition to verifying that the message is aligned on MBS boundaries, the CID filter 134 may also verify that the memory address of the I/O transaction is within the TIO PRM range associated with the CID and/or perform other trusted I/O operations. After writing the plaintext data to the TIO PRM, the CID filter 134 may raise an interrupt, generate a DMA completion, or otherwise notify the computing device 100, and in response the computing device 100 may invoke the cryptographic engine 124 of the processor 120 to copy and encrypt the I/O data, as described further below in connection with FIG. 6. After writing the plaintext data, the method 500 loops back to block 502 to continue monitoring for I/O transactions.

Figure 6:
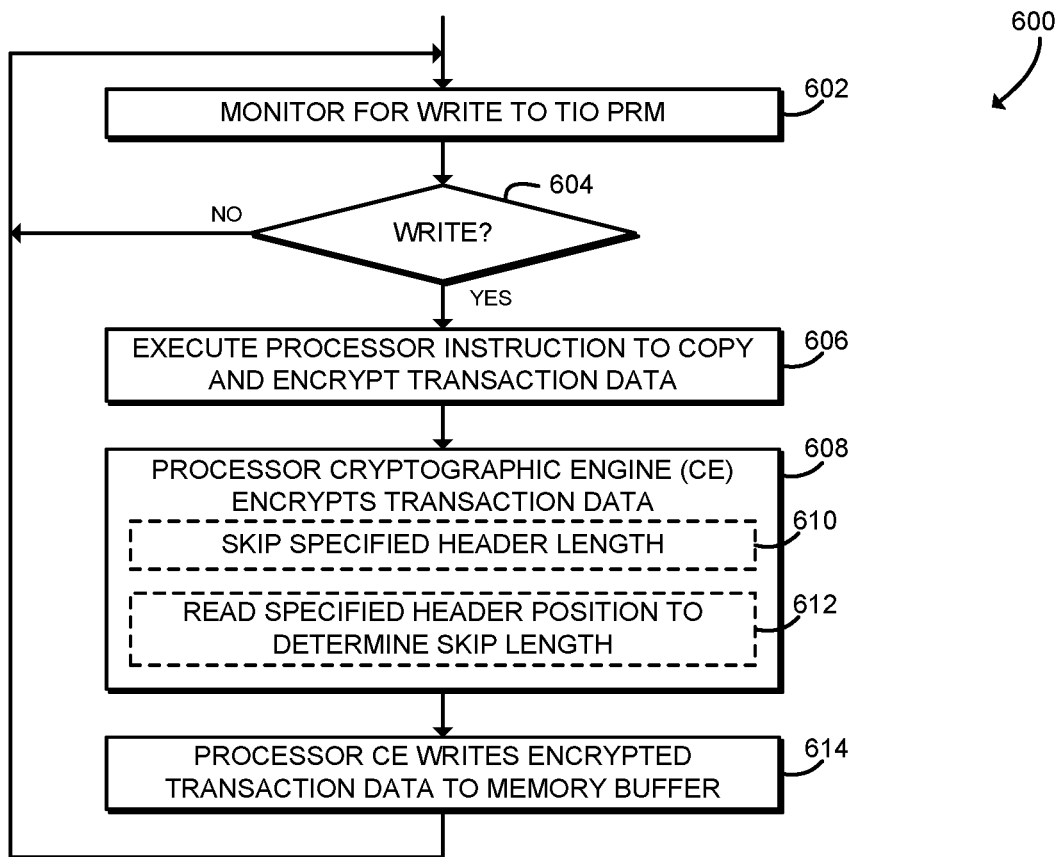
FIG. 6 is a simplified flow diagram of at least one embodiment of a method for protecting I/O transfers with header data using a processor-based cryptographic engine that may be executed by the computing device of FIGS. 1-2.

Referring now to FIG. 6, in use, the computing device 100 may execute a method 600 for protecting I/O transfers with header data using a processor-based cryptographic engine 124. It should be appreciated that, in some embodiments, the operations of the method 600 may be performed by one or more components of the environment 200 of the computing device 100 as shown in FIG. 2. The method 600 begins in block 602, in which the computing device 100 monitors for a write to the trusted I/O (TIO) processor reserved memory (PRM) range. For example, as described above in connection with FIG. 5, a device driver, filter driver, or other untrusted software of the computing device 100 may monitor for a DMA completion, an interrupt, or other notification that indicates that plaintext I/O data has been written to the TIO PRM. In block 604, the computing device 100 determines whether a write has occurred. If not, the method 600 loops back to block 602 to continue monitoring for writes. If a write has occurred, the method 600 advances to block 606.

In block 606, the computing device 100 executes a processor instruction or other processor feature to copy and encrypt I/O transaction data from the TIO PRM to a memory buffer. For example, the computing device 100 may invoke a TIO_COPY_ENCRYPT instruction, model-specific register, or other feature of the processor 120. The computing device 100 may supply the processor 120 with an address within the TIO PRM that contains the plaintext I/O transaction data. The computing device 100 may also verify that the address of the plaintext I/O transaction data starts on an MBS boundary, which may guarantee message integrity.

In block 608, in response to invocation of the processor feature, the cryptographic engine (CE) 124 of the processor 120 encrypts the I/O transaction with optional header skipping. The CE 124 may encrypt the transaction using an encryption key that is associated with the CID of the I/O transaction. The CE 124 may use any appropriate cryptographic algorithm to encrypt the I/O transaction, such as AES-GCM.

In some embodiments, in block 610 the CE 124 may skip a specified header length. In other words, the CE 124 may leave a pre-programmed length of data unencrypted, starting at the SOM. The unencrypted data may include, for example, metadata or other header data. The header length may be provided to the CE 124, for example, as a parameter passed to the COPY_ENCRYPT processor instruction or other processor feature used to invoke the CE 124.

In some embodiments, in block 612 the CE 124 may read a field at a specified header position relative to the SOM to determine the skip length. For example, the CE 124 may read the first byte of the message starting at the SOM to determine the skip length, and then leave than number of bytes of the message unencrypted. The header position may be provided to the CE 124, for example, as a parameter passed to the COPY_ENCRYPT processor instruction or other processor feature used to invoke the CE 124.

In block 614, the CE 124 writes the encrypted transaction data, including any unencrypted header data, to a memory buffer. The memory buffer may be embodied as, for example, a kernel I/O buffer or other buffer accessible by software of the computing device 100. As described above, after being written by the CE 124, the buffer may be processed with an ordinary I/O stack of the computing device 100. After writing the data, the method 600 loops back to block 602 to continue monitoring for writes to the TIO PRM.

Figure 7:
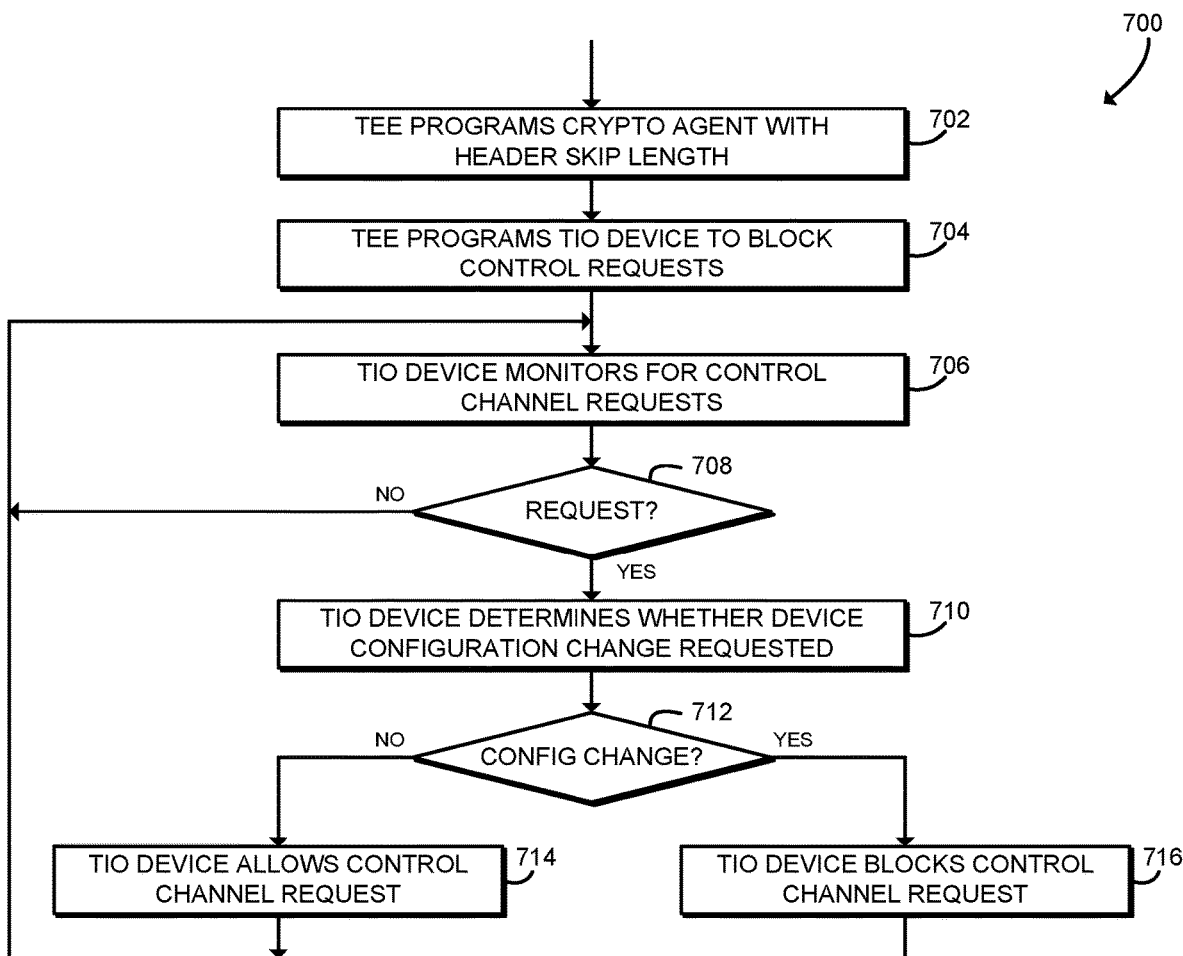
FIG. 7 is a simplified flow diagram of at least one embodiment of a method for protecting I/O device configuration that may be executed by the computing device of FIGS. 1-2.

Referring now to FIG. 7, in use, the computing device 100 may execute a method 700 for protecting I/O device configuration. It should be appreciated that, in some embodiments, the operations of the method 700 may be performed by one or more components of the environment 200 of the computing device 100 as shown in FIG. 2. The method 700 begins in block 702, in which the trusted execution environment (TEE) 202 of the computing device 100 programs a cryptographic agent (i.e., the inline cryptographic engine 136 or the processor-based cryptographic engine 124) with a header skip length. As described above, the cryptographic agent may skip the specified length of data at the start of message, leaving that data unencrypted. The unencrypted data may include metadata or other header data generated by the I/O device 140 and/or I/O controller 138. Thus, the particular skip length may depend on a device configuration of the I/O device 140. To prevent malicious software or other untrusted software from changing the device configuration (and thereby potentially sensitive I/O data to be unencrypted), in block 704 the TEE programs the TIO device 210 to block control channel requests. The TIO device 210 may be embodied as a fixed I/O device 140 that is permanently coupled to the I/O controller 138. For example, the TIO device 210 may be embodied as a USB device incorporated in or otherwise physically coupled to a USB xHC controller.

After being programmed, in block 706, the TIO device 210 monitors for control channel requests. Each I/O device 140 may be capable of communicating over multiple channels. In particular, each I/O device 140 may receive control channel requests (including device configuration change requests) over a control channel. The TIO device 210 is capable of snooping or otherwise intercepting communications via the I/O controller 138 to other I/O devices 140. For example, the TIO device 210 may be integrated in the I/O controller 138. In block 708, the TIO device 210 determines whether a control channel request has been received. If not, the method 700 loops back to block 706 to continue monitoring for control channel requests. If a control channel request is received, the method 700 advances to block 710.

In block 710, the TIO device 210 determines whether the control channel request includes a request to change the device configuration of an I/O device 140. The device configuration change may result in, among other things, a change in the format of messages sent by the I/O controller 138. In particular, the device configuration change could cause the I/O device 140 to send a shorter header, which could cause potentially sensitive I/O data to be unencrypted. In block 712, the TIO device 210 checks whether a device configuration change is requested. If not, the method 700 branches to block 714, in which the TIO device 210 allows the control channel request. After allowing the control channel request, the method 700 loops back to block 706 to continue monitoring for control channel requests. Referring back to block 712, if a device configuration change is requested, the method 700 branches to block 716, in which the TIO device 210 blocks the control channel request. After blocking the control channel request, the method 700 loops back to block 706 to continue monitoring for control channel requests.

Figure 8:
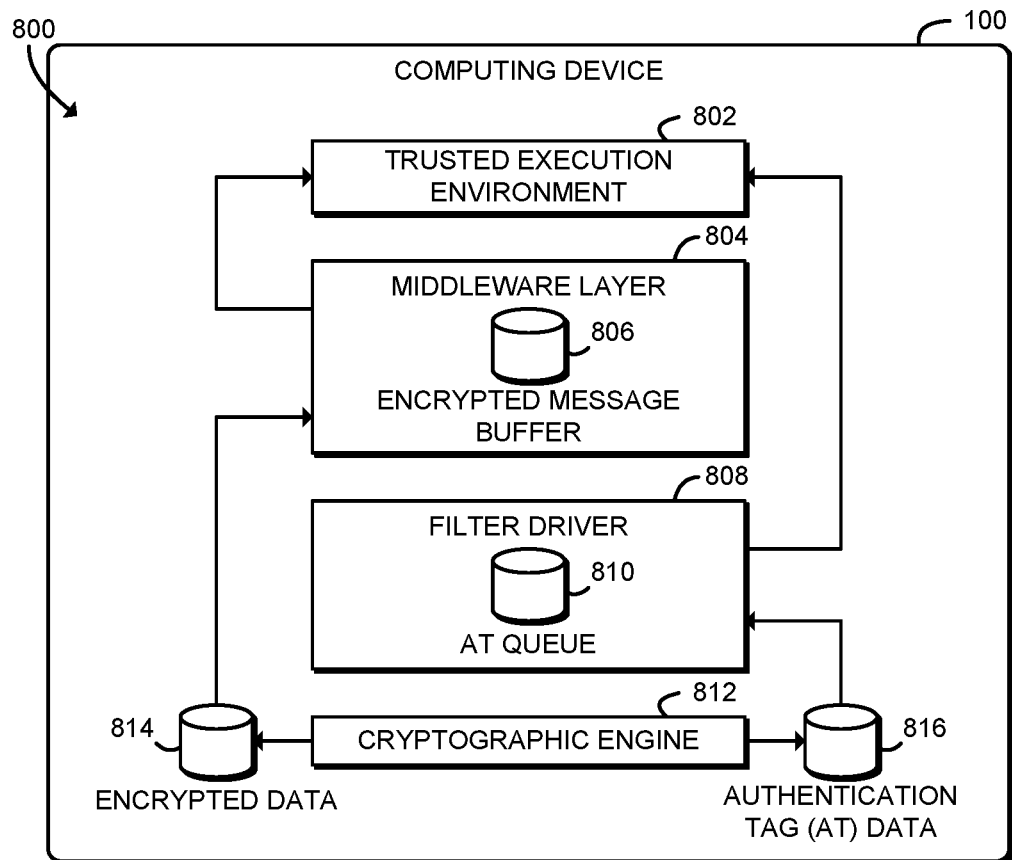
FIG. 8 is a simplified block diagram of at least one embodiment of an environment of the computing device of FIG. 1.

Referring now to FIG. 8, in an illustrative embodiment, the computing device 100 establishes an environment 800 during operation. The illustrative environment 800 includes a trusted execution environment 802, a middleware layer 804, a filter driver 808, and a cryptographic engine 812. The various components of the environment 800 may be embodied as hardware, firmware, software, or a combination thereof. As such, in some embodiments, one or more of the components of the environment 800 may be embodied as circuitry or collection of electrical devices (e.g., trusted execution environment circuitry 802, middleware circuitry 804, filter driver circuitry 808, and/or cryptographic engine circuitry 812). It should be appreciated that, in such embodiments, one or more of the trusted execution environment circuitry 802, the middleware circuitry 804, the filter driver circuitry 808, and/or the cryptographic engine circuitry 812 may form a portion of the processor 120, the I/O subsystem 126, the CID filter 134, the cryptographic engine 136, and/or other components of the computing device 100. Additionally, in some embodiments, one or more of the illustrative components may form a portion of another component and/or one or more of the illustrative components may be independent of one another.

The cryptographic engine 812 is configured to perform authenticated encryption operations on I/O messages to generate corresponding authentication tags (ATs) and encrypted messages. The encrypted messages may be stored in an encrypted data 814 stream, and the ATs may be stored in an AT data 816 stream. The cryptographic engine 812 may be embodied as, for example, the processor-based cryptographic engine 124 of the processor 120 or the inline cryptographic engine 136.

The filter driver 808 is configured to store an AT queue entry in an AT queue 810 in response to performing each authenticated encryption operation. Each AT queue entry includes a hash, a message length, and the AT. The hash includes a predetermined number of bytes from the start of the encrypted message (e.g., four bytes).

The middleware layer 804 is configured to concatenate multiple encrypted messages in an encrypted message buffer 806. The middleware layer 804 may drop one or more encrypted messages from the encrypted data 814, for example if the encrypted messages are not being processed quickly enough to keep up with the cryptographic engine 812.

The trusted execution environment (TEE) 802 may be embodied as any trusted software and/or hardware environment of the computing device 100. For example, the TEE 802 may be embodied as one or more application enclaves, device driver enclaves, or other secure enclaves established using the secure enclave support 122 of the processor 120. The trusted execution environment 802 is configured to determine whether a hash of the next AT queue entry of the AT queue 810 matches a hash of the next encrypted message of the encrypted message buffer 806. The hash of the next encrypted message also includes the predetermined number of bytes from the start of the encrypted message. The TEE 802 is further configured to perform an authenticated decryption operation on the next encrypted message with the AT of the next AT queue entry if the hashes match. The TEE is further configured to increment an index in the AT queue if the hashes do not match. In some embodiments, the TEE 802 may be configured to determine whether the AT queue 810 and the encrypted message buffer 806 are synchronized and, if not, drop one or more encrypted messages from the encrypted message buffer 806.

Figure 9:
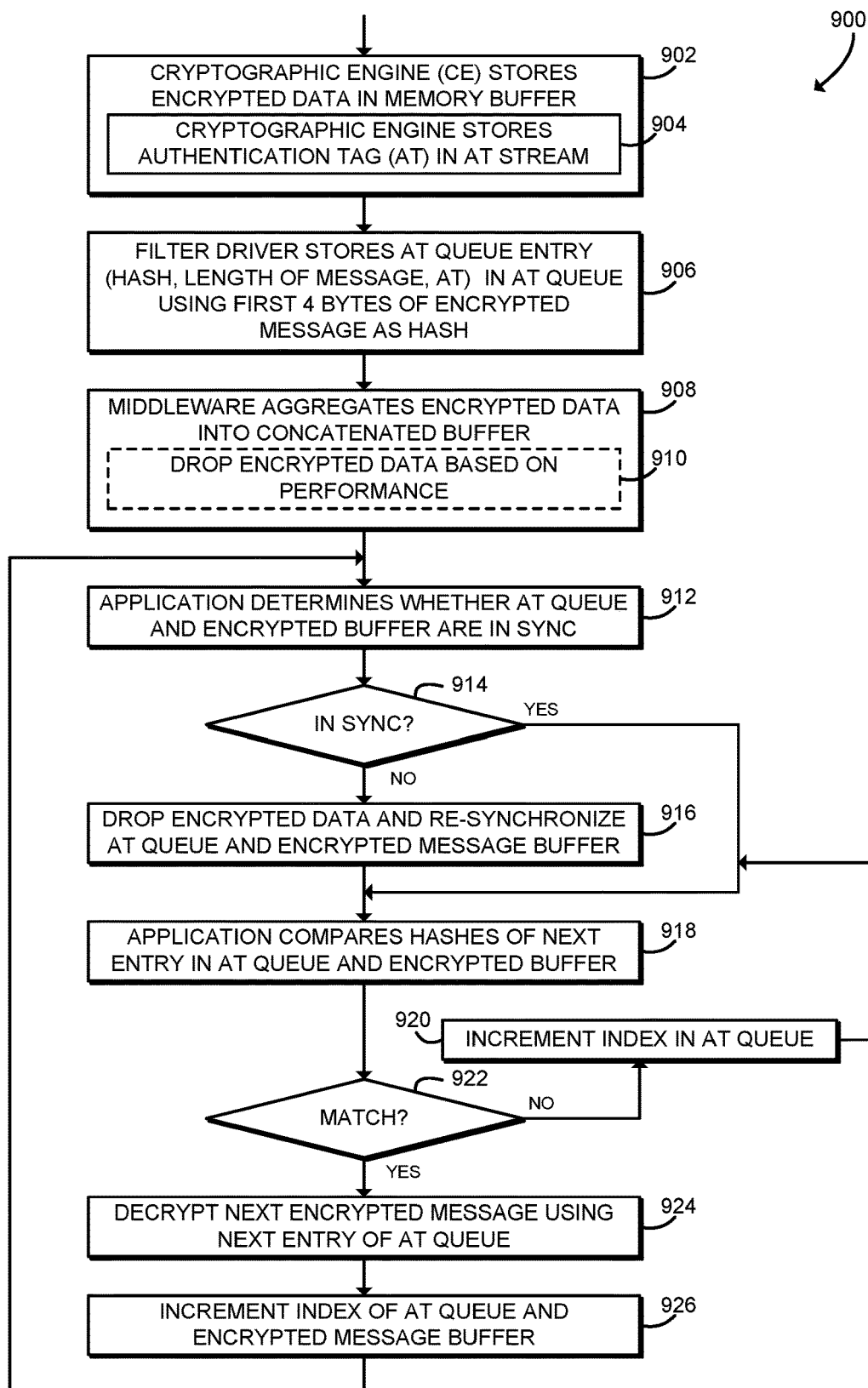
FIG. 9 is a simplified flow diagram of at least one embodiment of a method for matching encrypted data with authentication tags that may be executed by the computing device of FIGS. 1 and 8.

Referring now to FIG. 9, in use, the computing device 100 may execute a method 900 for matching encrypted data with authentication tags. It should be appreciated that, in some embodiments, the operations of the method 900 may be performed by one or more components of the environment 800 of the computing device 100 as shown in FIG. 8. The method 900 begins in block 902, in which a cryptographic engine 812 stores encrypted I/O data in a memory buffer 814. The cryptographic engine 812 may generate the encrypted data using an authenticated encryption operation, such as AES-GCM. Thus, in block 904, the cryptographic engine 812 also stores authentication tag data in an authentication tag stream 816.

In block 906, the filter driver 808 stores an AT queue entry in the AT queue 810 for each AT in the AT data 816. Each AT queue entry may include a hash of the encrypted message, the length of the encrypted message authenticated by the AT, and the AT itself. The hash is the first four bytes of the AT data. Because the leading four bytes of an encrypted message are uniformly distributed (i.e., because AES is a pseudorandom function), the probability of a hash collision is around ~$2^{-32}$. If the encrypted message is less than four bytes long, the hash may be zero-padded, and the application may not compare more than the length of message bytes when the length is less than four bytes.

In block 908, the middleware layer 804 aggregates and concatenates encrypted messages from the encrypted data 814 into the encrypted message buffer 806. For example, each encrypted message may represent a micro-frame generated by an I/O device 140 such as a USB camera, and the middleware layer 804 may concatenate the micro-frames into a single video frame. In some embodiments, in block 910 the middleware layer 804 may drop one or more encrypted messages based on performance. For example, if unable to keep up with the video framerate of a USB camera, the middleware layer 804 may drop one or more microframes or video frames. Note that even if one or more encrypted messages are dropped and not included in the encrypted message buffer 806, the associated AT entries are not dropped from the AT queue 810.

In block 912, an application (e.g., the trusted execution environment 802 or other ISV application executed by the computing device 100) determines whether the AT queue 810 and the encrypted message buffer 806 are synchronized. For example, in some embodiments, a producer of AT queue entries (e.g., the filter driver 808 or cryptographic engine 812) may maintain an enqueue pointer and a consumer (e.g., the application) may maintain a dequeue pointer to manage writing and reading AT queue entries. The enqueue pointer may be a free flowing pointer that can cross the dequeue pointer. Each of the enqueue pointers and the dequeue pointers may include a pass field, and the pass field of the enqueue pointer may be incremented when the enqueue pointer crosses the dequeue pointer. Thus, the application may determine whether the AT queue 810 and the encrypted message buffer 806 are synchronized by determining whether the pass fields of the enqueue pointer and dequeue pointer match. If those pass fields do not match, then the enqueue pointer has passed the dequeue pointer, meaning that one more AT queue entries may have been overwritten and lost. In block 914, the application checks whether the AT queue 810 and the encrypted message buffer 806 are in sync. If so, the method 900 skips ahead to block 918, described below. If the AT queue 810 and the encrypted message buffer 806 are not synchronized, the method 900 advances to block 916.

In block 916, the application drops data from the encrypted message buffer 806 and resynchronizes the AT queue 810 and the encrypted message buffer 806. For example, the application may drop the current "frame" of encrypted data and start a forward search to find a match using the encrypted message data and hash, starting from the next AT queue entry after the enqueue pointer. Once the search returns a match, the ATs are now re-synced, the dequeue pointer may be updated to match the entry address+1, and the normal in-sync scenario may be performed.

In block 918, the application compares the hashes of the next entry in the AT queue 810 and the encrypted message buffer 806. Because each of the hashes may be embodied as a four-byte value, the comparison may be performed as a simple integer comparison. Additionally, although illustrated as comparing hashes for a single AT entry-encrypted message combination, in some embodiments the application may compare hashes for multiple consecutive entries, to reduce the likelihood of a false match.

In some embodiments, when messages lengths are frequently less than 4 bytes, collisions may occur during tag matching. That is, the hash value may not be unique because of the short length. To recover, the application may use the initial byte in the encrypted message to find a corresponding AT queue entry. To prevent collisions, the matching may be continued until sufficient confidence is achieved. Sufficient confidence may be, for example, continuing to perform the match of encrypted messages with the hash entries in the AT queue ahead until the lengths of matched encrypted messages reaches four bytes. If the match succeeds, than the application may fall back to the normal synchronized case described above.

After comparing the hashes, the method 900 advances to block 922, in which the application determines whether the hash of the next entry in the AT queue 810 matches the hash of the next encrypted message of the encrypted message buffer 806. If not, the method 900 branches to block 920.

In block 920, the application increments the current index in the AT queue 810 and then loops back to block 918 to continue comparing hashes. Thus, the application may perform a forward search through to AT queue 810 to find the an AT that matches the next encrypted message of the encrypted message buffer 806.

Referring back to block 922, if the hashes match, the method 900 advances to block 924, in which the application decrypts the next encrypted message of the encrypted message buffer 806 using the next entry of the AT queue 810. In particular, the application may supply the AT to an authenticated decryption algorithm (such as AES-GCM) to decrypt the encrypted message. In block 926, the application increments the indices of the AT queue 810 and the encrypted message buffer 806. After incrementing the indices, the method 900 loops back to block 912 to continue processing encrypted messages in the encrypted message buffer 806.

It should be appreciated that, in some embodiments, the methods 300, 400, 500, 600, 700, and/or 900 may be embodied as various instructions stored on a computer-readable media, which may be executed by the processor 120, the I/O subsystem 126, and/or other components of the computing device 100 to cause the computing device 100 to perform the respective method 300, 400, 500, 600, 700, and/or 900. The computer-readable media may be embodied as any type of media capable of being read by the computing device 100 including, but not limited to, the memory 128, the data storage device 130, firmware devices, other memory or data storage devices of the computing device 100, portable media readable by a peripheral device 140 of the computing device 100, and/or other media.

EXAMPLES

Illustrative examples of the technologies disclosed herein are provided below. An embodiment of the technologies may include any one or more, and any combination of, the examples described below.

Example 1 includes a computing device for trusted I/O message transfer, the computing device comprising: an I/O controller; a hardware cryptographic agent to (i) intercept a message from the I/O controller, wherein the message comprises one or more direct memory access transactions generated by the I/O controller, (ii) determine a start of message of the message in response to interception of the message, wherein the start of message comprises a start of a first direct memory access transaction of the message, and (iii) determine a message length of the message in response to the interception of the message; and a cryptographic engine to (i) encrypt I/O data of the message to generate encrypted I/O data in response to a determination of the start of message and a determination of the message length, and (ii) write the encrypted I/O data to a memory buffer of the computing device.

Example 2 includes the subject matter of Example 1, and wherein to determine the start of message comprises to receive a header of the first direct memory access transaction, wherein the header is indicative of the start of message.

Example 3 includes the subject matter of any of Examples 1 and 2, and wherein to determine the message length comprises to reset a message length counter in response to interception of the first direct memory access transaction of the message; and add a transaction length of each direct memory access transaction of the message to the message length counter in response to interception of each direct memory access transaction of the message.

Example 4 includes the subject matter of any of Examples 1-3, and wherein to encrypt the I/O data to generate the encrypted I/O data comprises to skip a predetermined header length of the message that starts at the start of message.

Example 5 includes the subject matter of any of Examples 1-4, and further comprising a trusted execution environment and a trusted I/O device coupled to the I/O controller, wherein: the trusted execution environment is to program the trusted I/O device to block control requests; and the trusted I/O device is to (i) intercept a control channel request in response to programming of the trusted I/O device, (ii) determine whether the control channel request comprises a device configuration change request, and (iii) block the control channel request in response to a determination that the control channel request comprises the device configuration change request.

Example 6 includes the subject matter of any of Examples 1-5, and wherein to encrypt the I/O data to generate the encrypted I/O data comprises to (i) read a header length value at a predetermined position of the message relative to the start of message, and (ii) skip the header length value of the message starting at the start of message.

Example 7 includes the subject matter of any of Examples 1-6, and wherein the hardware cryptographic agent comprises the cryptographic engine.

Example 8 includes the subject matter of any of Examples 1-7, and further comprising: a trusted execution environment to program the cryptographic engine with a predetermined header length; wherein to encrypt the I/O data to generate the encrypted I/O data comprises to skip the predetermined header length of the message starting at the start of message.

Example 9 includes the subject matter of any of Examples 1-8, and further comprising: a trusted execution environment to program the cryptographic engine with a predetermined position; wherein to encrypt the I/O data to generate the encrypted I/O data comprises to (i) read a header length value at the predetermined position of the message relative to the start of message, and (ii) skip the header length value of the message starting at the start of message.

Example 10 includes the subject matter of any of Examples 1-9, and further comprising: a channel identifier (CID filter), wherein CID filter comprises the hardware cryptographic agent; and a processor, wherein the processor comprises the cryptographic engine.

Example 11 includes the subject matter of any of Examples 1-10, and wherein the CID filter is to: determine whether a memory address of the start of message is aligned on a message block size boundary in response to the interception of the message; block the message in response to a determination that the memory address of the start of message is not aligned on the message block size boundary; and allow the message in response to a determination that the memory address of the start of message is aligned on the message block size boundary.

Example 12 includes the subject matter of any of Examples 1-11, and further comprising a trusted execution environment to program the CID filter with a message block size, wherein the message block size boundary is based on the message block size.

Example 13 includes the subject matter of any of Examples 1-12, and wherein the CID filter is further to: determine whether a message length of the message is greater than a message block size, wherein the message block size boundary is based on the message block size; and blocking, by the CID filter, the message in response to determining that the message length of the message is greater than the message block size; wherein allowing the message further comprises allowing the message in response to determining that the message length of the message is not greater than the message block size.

Example 14 includes the subject matter of any of Examples 1-13, and further comprising: an I/O manager to (i) write the message to a shadow memory buffer of the computing device in response to allowance of the message, wherein the shadow memory buffer is inaccessible to software of the computing device, and (ii) invoke a processor instruction to copy and encrypt the message in response to a writing of the message to the shadow memory buffer; wherein to encrypt the I/O data of the message comprises to encrypt the I/O data of the message in response to invocation of the processor instruction; and wherein to write the encrypted I/O data comprises to write the encrypted I/O data in response to invocation of the processor instruction.

Example 15 includes the subject matter of any of Examples 1-14, and wherein: to invoke the processor instruction comprises to invoke the processor instruction with a predetermined header length; and to encrypt the I/O data to generate the encrypted I/O data comprises to skip the predetermined header length of the message starting at the start of message.

Example 16 includes the subject matter of any of Examples 1-15, and wherein: to invoke the processor instruction comprises to invoke the processor instruction with a predetermined position; and to encrypt the I/O data to generate the encrypted I/O data comprises to (i) read a header length value at the predetermined position of the message relative to the start of message, and (ii) skip the header length value of the message starting at the start of message.

Example 17 includes a computing device for trusted I/O, the computing device comprising: a cryptographic engine to perform an authenticated encryption operation on an I/O message to generate an authentication tag and an encrypted message; and a filter driver to store an authentication tag queue entry in an authentication tag queue in response to performance of the authenticated encryption operation, wherein the authentication tag queue entry comprises a hash, a message length, and the authentication tag, and wherein the hash comprises a predetermined number of bytes from the start of the encrypted message.

Example 18 includes the subject matter of Example 17, and further comprising: a middleware layer to concatenate a plurality of encrypted messages in an encrypted message buffer; and a trusted execution environment to: determine whether a first hash of a first authentication tag queue entry of the authentication tag queue matches a second hash of a first encrypted message of the encrypted message buffer, wherein the second hash comprises the predetermined number of bytes from the start of the first encrypted message; perform an authenticated decryption operation on the first encrypted message with a first authentication tag of the first authentication tag queue entry in response to a determination that the first hash matches the second hash; and increment an index in the authentication tag queue in response to a determination that the first hash does not match the second hash.

Example 19 includes the subject matter of any of Examples 17 and 18, and wherein the trusted execution environment comprises an application enclave established by secure enclave support of a processor of the computing device.

Example 20 includes the subject matter of any of Examples 17-19, and wherein the trusted execution environment is further to: determine whether the authentication tag queue and the encrypted message buffer are synchronized; and drop one or more encrypted messages from the encrypted message buffer in response to a determination that the authentication tag queue and the encrypted message buffer are not synchronized; wherein to determine whether the first hash matches the second hash comprises to determine whether the first hash matches the second hash in response to a determination that the authentication tag queue and the encrypted message buffer are synchronized or in response to dropping of the one or more encrypted messages.

Example 21 includes a method for trusted I/O message transfer, the method comprising: intercepting, by a hardware cryptographic agent of a computing device, a message from an I/O controller of the computing device, wherein the message comprises one or more direct memory access transactions generated by the I/O controller; determining, by the cryptographic agent, a start of message of the message in response to intercepting the message, wherein the start of message comprises a start of a first direct memory access transaction of the message; determining, by the cryptographic agent, a message length of the message in response to intercepting the message; encrypting, by the computing device, I/O data of the message to generate encrypted I/O data in response to determining the start of message and determining the message length; and writing, by the computing device, the encrypted I/O data to a memory buffer of the computing device.

Example 22 includes the subject matter of Example 21, and wherein determining the start of message comprises receiving a header of the first direct memory access transaction, wherein the header is indicative of the start of message.

Example 23 includes the subject matter of any of Examples 21 and 22, and wherein determining the message length comprises resetting a message length counter in response to intercepting the first direct memory access transaction of the message; and adding a transaction length of each direct memory access transaction of the message to the message length counter in response to intercepting each direct memory access transaction of the message.

Example 24 includes the subject matter of any of Examples 21-23, and wherein encrypting the I/O data to generate the encrypted I/O data comprises skipping a predetermined header length of the message starting at the start of message.

Example 25 includes the subject matter of any of Examples 21-24, and further comprising: programming, by the computing device, a trusted I/O device to block control requests, wherein the trusted I/O device is coupled to the I/O controller; intercepting, by the trusted I/O device, a control channel request in response to programming the trusted I/O device; determining, by the trusted I/O device, whether the control channel request comprises a device configuration change request; and blocking, by the trusted I/O device, the control channel request in response to determining that the control channel request comprises the device configuration change request.

Example 26 includes the subject matter of any of Examples 21-25, and wherein encrypting the I/O data to generate the encrypted I/O data comprises (i) reading a header length value at a predetermined position of the message relative to the start of message, and (ii) skipping the header length value of the message starting at the start of message.

Example 27 includes the subject matter of any of Examples 21-26, and wherein: the hardware cryptographic agent comprises a cryptographic engine of the computing device; encrypting the I/O data of the message comprises encrypting the I/O data of the message by the cryptographic engine; and writing the encrypted I/O data comprises writing the encrypted I/O data by the cryptographic engine.

Example 28 includes the subject matter of any of Examples 21-27, and further comprising: programming, by the computing device, the cryptographic engine with a predetermined header length; wherein encrypting the I/O data to generate the encrypted I/O data comprises skipping the predetermined header length of the message starting at the start of message.

Example 29 includes the subject matter of any of Examples 21-28, and further comprising: programming, by the computing device, the cryptographic engine with a predetermined position; wherein encrypting the I/O data to generate the encrypted I/O data comprises (i) reading a header length value at the predetermined position of the message relative to the start of message, and (ii) skipping the header length value of the message starting at the start of message.

Example 30 includes the subject matter of any of Examples 21-29, and wherein: the hardware cryptographic agent comprises a channel identifier (CID) filter of the computing device; encrypting the I/O data of the message comprises encrypting the I/O data of the message by the processor; and writing the encrypted I/O data comprises writing the encrypted I/O data by the processor.

Example 31 includes the subject matter of any of Examples 21-30, and further comprising: determining, by the CID filter, whether a memory address of the start of message is aligned on a message block size boundary in response to intercepting the message; blocking, by the CID filter, the message in response to determining that the memory address of the start of message is not aligned on the message block size boundary; and allowing, by the CID filter, the message in response to determining that the memory address of the start of message is aligned on the message block size boundary.

Example 32 includes the subject matter of any of Examples 21-31, and further comprising programming, by the computing device, the CID filter with a message block size, wherein the message block size boundary is based on the message block size.

Example 33 includes the subject matter of any of Examples 21-32, and further comprising: determining, by the CID filter, whether a message length of the message is greater than a message block size, wherein the message block size boundary is based on the message block size; and blocking, by the CID filter, the message in response to determining that the message length of the message is greater than the message block size; wherein allowing the message further comprises allowing the message in response to determining that the message length of the message is not greater than the message block size.

Example 34 includes the subject matter of any of Examples 21-33, and further comprising: writing, by the computing device, the message to a shadow memory buffer of the computing device in response to allowing the message, wherein the shadow memory buffer is inaccessible to software of the computing device; and invoking, by the computing device, a processor instruction to copy and encrypt the message in response to writing the message to the shadow memory buffer; wherein encrypting the I/O data of the message comprises encrypting the I/O data of the message in response to invoking the processor instruction; and wherein writing the encrypted I/O data comprises writing the encrypted I/O data in response to invoking the processor instruction.

Example 35 includes the subject matter of any of Examples 21-34, and wherein: invoking the processor instruction comprises invoking the processor instruction with a predetermined header length; and encrypting the I/O data to generate the encrypted I/O data comprises skipping the predetermined header length of the message starting at the start of message.

Example 36 includes the subject matter of any of Examples 21-35, and wherein: invoking the processor instruction comprises invoking the processor instruction with a predetermined position; and encrypting the I/O data to generate the encrypted I/O data comprises (i) reading a header length value at the predetermined position of the message relative to the start of message, and (ii) skipping the header length value of the message starting at the start of message.

Example 37 includes a method for trusted I/O, the method comprising: performing, by a cryptographic engine of a computing device, an authenticated encryption operation on an I/O message to generate an authentication tag and an encrypted message; and storing, by the computing device, an authentication tag queue entry in an authentication tag queue in response to performing the authenticated encryption operation, wherein the authentication tag queue entry comprises a hash, a message length, and the authentication tag, and wherein the hash comprises a predetermined number of bytes from the start of the encrypted message.

Example 38 includes the subject matter of Example 37, and further comprising: concatenating, by the computing device, a plurality of encrypted messages in an encrypted message buffer; determining, by a trusted execution environment of the computing device, whether a first hash of a first authentication tag queue entry of the authentication tag queue matches a second hash of a first encrypted message of the encrypted message buffer, wherein the second hash comprises the predetermined number of bytes from the start of the first encrypted message; performing, by the trusted execution environment, an authenticated decryption operation on the first encrypted message with a first authentication tag of the first authentication tag queue entry in response to determining that the first hash matches the second hash; and incrementing, by the trusted execution environment, an index in the authentication tag queue in response to determining that the first hash does not match the second hash.

Example 39 includes the subject matter of any of Examples 37 and 38, and wherein the trusted execution environment comprises an application enclave established by secure enclave support of a processor of the computing device.

Example 40 includes the subject matter of any of Examples 37-39, and further comprising: determining, by the trusted execution environment, whether the authentication tag queue and the encrypted message buffer are synchronized; and dropping, by the trusted execution environment, one or more encrypted messages from the encrypted message buffer in response to determining that the authentication tag queue and the encrypted message buffer are not synchronized; wherein determining whether the first hash matches the second hash comprises determining whether the first hash matches the second hash in response to determining that the authentication tag queue and the encrypted message buffer are synchronized or in response to dropping the one or more encrypted messages.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for trusted I/O message transfer, the computing device comprising: means for intercepting, by a hardware cryptographic agent of the computing device, a message from an I/O controller of the computing device, wherein the message comprises one or more direct memory access transactions generated by the I/O controller; means for determining, by the cryptographic agent, a start of message of the message in response to intercepting the message, wherein the start of message comprises a start of a first direct memory access transaction of the message; means for determining, by the cryptographic agent, a message length of the message in response to intercepting the message; means for encrypting I/O data of the message to generate encrypted I/O data in response to determining the start of message and determining the message length; and means for writing the encrypted I/O data to a memory buffer of the computing device.

Example 45 includes the subject matter of Example 44, and wherein the means for determining the start of message comprises means for receiving a header of the first direct memory access transaction, wherein the header is indicative of the start of message.

Example 46 includes the subject matter of any of Examples 44 and 45, and wherein the means for determining the message length comprises: means for resetting a message length counter in response to intercepting the first direct memory access transaction of the message; and means for adding a transaction length of each direct memory access transaction of the message to the message length counter in response to intercepting each direct memory access transaction of the message.

Example 47 includes the subject matter of any of Examples 44-46, and wherein the means for encrypting the I/O data to generate the encrypted I/O data comprises means for skipping a predetermined header length of the message starting at the start of message.

Example 48 includes the subject matter of any of Examples 44-47, and further comprising: means for programming a trusted I/O device to block control requests, wherein the trusted I/O device is coupled to the I/O controller; means for intercepting, by the trusted I/O device, a control channel request in response to programming the trusted I/O device; means for determining, by the trusted I/O device, whether the control channel request comprises a device configuration change request; and means for blocking, by the trusted I/O device, the control channel request in response to determining that the control channel request comprises the device configuration change request.

Example 49 includes the subject matter of any of Examples 44-48, and wherein the means for encrypting the I/O data to generate the encrypted I/O data comprises (i) means for reading a header length value at a predetermined position of the message relative to the start of message, and (ii) means for skipping the header length value of the message starting at the start of message.

Example 50 includes the subject matter of any of Examples 44-49, and wherein: the hardware cryptographic agent comprises a cryptographic engine of the computing device; the means for encrypting the I/O data of the message comprises means for encrypting the I/O data of the message by the cryptographic engine; and the means for writing the encrypted I/O data comprises means for writing the encrypted I/O data by the cryptographic engine.

Example 51 includes the subject matter of any of Examples 44-50, and further comprising: means for programming the cryptographic engine with a predetermined header length; wherein the means for encrypting the I/O data to generate the encrypted I/O data comprises means for skipping the predetermined header length of the message starting at the start of message.

Example 52 includes the subject matter of any of Examples 44-51, and further comprising: means for programming the cryptographic engine with a predetermined position; wherein the means for encrypting the I/O data to generate the encrypted I/O data comprises (i) means for reading a header length value at the predetermined position of the message relative to the start of message, and (ii) means for skipping the header length value of the message starting at the start of message.

Example 53 includes the subject matter of any of Examples 44-52, and wherein: the hardware cryptographic agent comprises a channel identifier (CID) filter of the computing device; the means for encrypting the I/O data of the message comprises means for encrypting the I/O data of the message by the processor; and the means for writing the encrypted I/O data comprises means for writing the encrypted I/O data by the processor.

Example 54 includes the subject matter of any of Examples 44-53, and further comprising: means for determining, by the CID filter, whether a memory address of the start of message is aligned on a message block size boundary in response to intercepting the message; means for blocking, by the CID filter, the message in response to determining that the memory address of the start of message is not aligned on the message block size boundary; and means for allowing, by the CID filter, the message in response to determining that the memory address of the start of message is aligned on the message block size boundary.

Example 55 includes the subject matter of any of Examples 44-54, and further comprising means for programming the CID filter with a message block size, wherein the message block size boundary is based on the message block size.

Example 56 includes the subject matter of any of Examples 44-55, and further comprising: means for determining, by the CID filter, whether a message length of the message is greater than a message block size, wherein the message block size boundary is based on the message block size; and means for blocking, by the CID filter, the message in response to determining that the message length of the message is greater than the message block size; wherein the means for allowing the message further comprises means for allowing the message in response to determining that the message length of the message is not greater than the message block size.

Example 57 includes the subject matter of any of Examples 44-56, and further comprising: means for writing the message to a shadow memory buffer of the computing device in response to allowing the message, wherein the shadow memory buffer is inaccessible to software of the computing device; and means for invoking a processor instruction to copy and encrypt the message in response to writing the message to the shadow memory buffer; wherein the means for encrypting the I/O data of the message comprises means for encrypting the I/O data of the message in response to invoking the processor instruction; and wherein the means for writing the encrypted I/O data comprises means for writing the encrypted I/O data in response to invoking the processor instruction.

Example 58 includes the subject matter of any of Examples 44-57, and wherein: the means for invoking the processor instruction comprises means for invoking the processor instruction with a predetermined header length; and the means for encrypting the I/O data to generate the encrypted I/O data comprises means for skipping the predetermined header length of the message starting at the start of message.

Example 59 includes the subject matter of any of Examples 44-58, and wherein: the means for invoking the processor instruction comprises means for invoking the processor instruction with a predetermined position; and the means for encrypting the I/O data to generate the encrypted I/O data comprises (i) means for reading a header length value at the predetermined position of the message relative to the start of message, and (ii) means for skipping the header length value of the message starting at the start of message.

Example 60 includes a computing device for trusted I/O, the computing device comprising: means for performing, by a cryptographic engine of a computing device, an authenticated encryption operation on an I/O message to generate an authentication tag and an encrypted message; and means for storing an authentication tag queue entry in an authentication tag queue in response to performing the authenticated encryption operation, wherein the authentication tag queue entry comprises a hash, a message length, and the authentication tag, and wherein the hash comprises a predetermined number of bytes from the start of the encrypted message.

Example 61 includes the subject matter of Example 60, and further comprising: means for concatenating a plurality of encrypted messages in an encrypted message buffer; means for determining, by a trusted execution environment of the computing device, whether a first hash of a first authentication tag queue entry of the authentication tag queue matches a second hash of a first encrypted message of the encrypted message buffer, wherein the second hash comprises the predetermined number of bytes from the start of the first encrypted message; means for performing, by the trusted execution environment, an authenticated decryption operation on the first encrypted message with a first authentication tag of the first authentication tag queue entry in response to determining that the first hash matches the second hash; and means for incrementing, by the trusted execution environment, an index in the authentication tag queue in response to determining that the first hash does not match the second hash.

Example 62 includes the subject matter of any of Examples 60 and 61, and wherein the trusted execution environment comprises an application enclave established by secure enclave support of a processor of the computing device.

Example 63 includes the subject matter of any of Examples 60-62, and further comprising: means for determining, by the trusted execution environment, whether the authentication tag queue and the encrypted message buffer are synchronized; and means for dropping, by the trusted execution environment, one or more encrypted messages from the encrypted message buffer in response to determining that the authentication tag queue and the encrypted message buffer are not synchronized; wherein the means for determining whether the first hash matches the second hash comprises means for determining whether the first hash matches the second hash in response to determining that the authentication tag queue and the encrypted message buffer are synchronized or in response to dropping the one or more encrypted messages.

The invention claimed is:

1. An apparatus comprising:
   processor circuitry coupled to a memory;
   an input/output (IO) controller to receive a plurality of IO messages from one or more IO devices;
   a cryptographic engine configured to perform encryption operations on the plurality of IO messages to generate a respective plurality of encrypted messages and a corresponding plurality of authentication tags (ATs), the cryptographic engine to store the respective plurality of encrypted messages in an encrypted message buffer and to store the corresponding plurality of ATs in an authentication tag queue;
   the processor circuitry to execute instructions to:
   operate a trusted execution environment (TEE), the TEE to authenticate a next encrypted message of the plurality of encrypted messages based on a comparison with a corresponding AT in the authentication tag queue and, in response to a successful authentication, to decrypt the next encrypted message to generate a decrypted message to be accessible within the TEE;
   determine whether the authentication tag queue and the encrypted-message buffer are synchronized; and
   drop one or more of the encrypted messages from the encrypted message buffer when the authentication tag queue and the encrypted message buffer are not synchronized, wherein each AT stored in the authentication tag queue comprises one or more of a hash, a message length, or an authentication tag.

2. The apparatus of claim 1, wherein to determine whether the authentication tag queue and the encrypted message buffer are synchronized comprises to determine whether an un-consumed entry of the authentication tag queue has been overwritten, wherein the hash comprises a predetermined number of bytes from a start of the encrypted message of the one or more encrypted messages.

3. The apparatus of claim 1, wherein the processor circuitry to host a hardware cryptographic agent having the cryptographic engine, and wherein the processor circuitry is in communication with the trusted execution environment having an application enclave established by secure enclave support for the processor circuitry.

4. A method comprising:
   receiving, by an input/output (IO) controller of a computing device, a plurality of IO messages from one or more IO devices;
   performing, by a cryptographic engine of the computing device, encryption operations on the plurality of IO messages to generate a respective plurality of encrypted messages and a corresponding plurality of authentication tags (ATs), the cryptographic engine to store the respective plurality of encrypted messages in an encrypted message buffer and to store the corresponding plurality of ATs in an authentication tag queue;
   authenticating, by a trusted execution environment (TEE) executed by a processor of the computing device, a next encrypted message of the plurality of encrypted messages based on a comparison with a corresponding AT in the authentication tag queue
   decrypting the next encrypted message in response to a successful authentication to generate a decrypted message to be accessible within the TEE;
   determining, by the processor of the computing device, whether the authentication tag queue and the encrypted message buffer are synchronized; and
   dropping one or more of the encrypted messages from the encrypted message buffer when the authentication tag queue and the encrypted message buffer are not synchronized, wherein each AT stored in the authentication tag queue comprises one or more of a hash, a message length, or an authentication tag.

5. The method of claim 4, wherein determining whether the authentication tag queue and the encrypted message buffer are synchronized comprises determining whether an un-consumed entry of the authentication tag queue has been overwritten, wherein the hash comprises a predetermined number of bytes from a start of the encrypted message of the one or more encrypted messages.

6. The method of claim 4, wherein the processor comprises a hardware cryptographic agent having the cryptographic engine, and wherein the processor circuitry is in communication with the trusted execution environment having an application enclave established by secure enclave support for the processor circuitry.

7. At least one computer-readable medium having stored thereon instructions which, when executed, cause a computing device to perform operations comprising:
   receiving, by an input/output (IO) controller of a computing device, a plurality of IO messages from one or more IO devices;
   performing, by a cryptographic engine of the computing device, encryption operations on the plurality of IO messages to generate a respective plurality of encrypted messages and a corresponding plurality of authentication tags (ATs), the cryptographic engine to store the respective plurality of encrypted messages in an encrypted message buffer and to store the corresponding plurality of ATs in an authentication tag queue;

authenticating, by a trusted execution environment (TEE) executed by a processor of the computing device, a next encrypted message of the plurality of encrypted messages based on a comparison with a corresponding AT in the authentication tag queue decrypting the next encrypted message in response to a successful authentication to generate a decrypted message to be accessible within the TEE;

determining, by the processor of the computing device, whether the authentication tag queue and the encrypted message buffer are synchronized; and dropping one or more of the encrypted messages from the encrypted message buffer when the authentication tag queue and the encrypted message buffer are not synchronized, wherein each AT stored in the authentication tag queue comprises one or more of a hash, a message length, or an authentication tag.

8. The computer-readable medium of claim 7, wherein determining whether the authentication tag queue and the encrypted message buffer are synchronized comprises determining whether an un-consumed entry of the authentication tag queue has been overwritten, wherein the hash comprises a predetermined number of bytes from a start of the encrypted message of the one or more encrypted messages.

9. The computer-readable medium of claim 7, wherein the computing device comprises a processor coupled to a memory, wherein the processor comprises a hardware cryptographic agent having the cryptographic engine, and wherein the processor circuitry is in communication with the trusted execution environment having an application enclave established by secure enclave support for the processor circuitry.

\* \* \* \* \*